US009868262B2

(12) United States Patent
Le Doucen

(10) Patent No.: US 9,868,262 B2
(45) Date of Patent: Jan. 16, 2018

(54) METHOD FOR APPLYING TO THE INNER WALL OF A TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventor: Jacques Le Doucen, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (FR)

( * ) Notice: Subject to any disclaimer, the term of this patent is extended or adjusted under 35 U.S.C. 154(b) by 342 days.

(21) Appl. No.: 14/430,313

(22) PCT Filed: Sep. 18, 2013

(86) PCT No.: PCT/EP2013/069336
§ 371 (c)(1),
(2) Date: Mar. 23, 2015

(87) PCT Pub. No.: WO2014/044696
PCT Pub. Date: Mar. 27, 2014

(65) Prior Publication Data
US 2015/0251368 A1     Sep. 10, 2015

(30) Foreign Application Priority Data

Sep. 24, 2012  (FR) ..................... 12 58923
Dec. 5, 2012   (FR) ..................... 12 61633

(51) Int. Cl.
*B29D 30/06*   (2006.01)
*B29C 73/22*   (2006.01)
(Continued)

(52) U.S. Cl.
CPC .......... *B29D 30/0685* (2013.01); *B05D 1/14* (2013.01); *B05D 5/00* (2013.01); *B05D 7/02* (2013.01);
(Continued)

(58) Field of Classification Search
CPC .................................................. B29D 30/0685
See application file for complete search history.

(56) References Cited

U.S. PATENT DOCUMENTS

| | | | |
|---|---|---|---|
| 4,957,573 A | 9/1990 | Gomberg |
| 5,085,942 A | 2/1992 | Hong |
| (Continued) | | | |

FOREIGN PATENT DOCUMENTS

| | | |
|---|---|---|
| CN | 102656029 A | 9/2012 |
| EP | 2042296 A1 | 4/2009 |
| (Continued) | | |

OTHER PUBLICATIONS

International Search Report for PCT/EP2013/069336 dated Nov. 28, 2013.
(Continued)

*Primary Examiner* — Alex A Rolland
(74) *Attorney, Agent, or Firm* — Dickinson Wright PLLC

(57) ABSTRACT

A process for applying particles to the inner wall of a tire comprising two sidewalls, a crown provided radially externally with a tread, a carcass-type reinforcing structure and at least one crown reinforcement, the inner surface of the sidewalls and of the crown forming an inner wall, at least one portion of said inner wall being covered with at least one layer of self-sealing composition.
The particles are applied after the curing of the tire.

9 Claims, 1 Drawing Sheet

(51) Int. Cl.
  *B05D 1/14*   (2006.01)
  *B05D 5/00*   (2006.01)
  *B05D 7/02*   (2006.01)
  *B29C 37/00*  (2006.01)

(52) U.S. Cl.
  CPC .......... *B29C 73/22* (2013.01); *B29C 37/0071* (2013.01); *B29D 2030/0682* (2013.01); *B29D 2030/0686* (2013.01); *B29D 2030/0693* (2013.01)

(56) References Cited

U.S. PATENT DOCUMENTS

| | | | |
|---|---|---|---|
| 2003/0230369 A1* | 12/2003 | Domer .................... | B29C 73/22 152/504 |
| 2009/0084482 A1 | 4/2009 | Majumdar et al. | |
| 2012/0273109 A1* | 11/2012 | Merino Lopez .... | B29C 47/0021 152/502 |
| 2014/0174639 A1 | 6/2014 | Merino Lopez et al. | |

FOREIGN PATENT DOCUMENTS

| | | |
|---|---|---|
| JP | 59187833 | 10/1984 |
| WO | 2011073171 | 6/2011 |
| WO | WO 2011073171 A1 * | 6/2011 ......... B29C 47/0021 |

OTHER PUBLICATIONS

Database WPI Week 198449, Oct. 25, 1984 Thomson Scientific, London, GB; AN 1984-303129 XP002695343-& JP 59 187833 A (Bridgestone Tire KK) Oct. 25, 1984 p. 184.

* cited by examiner

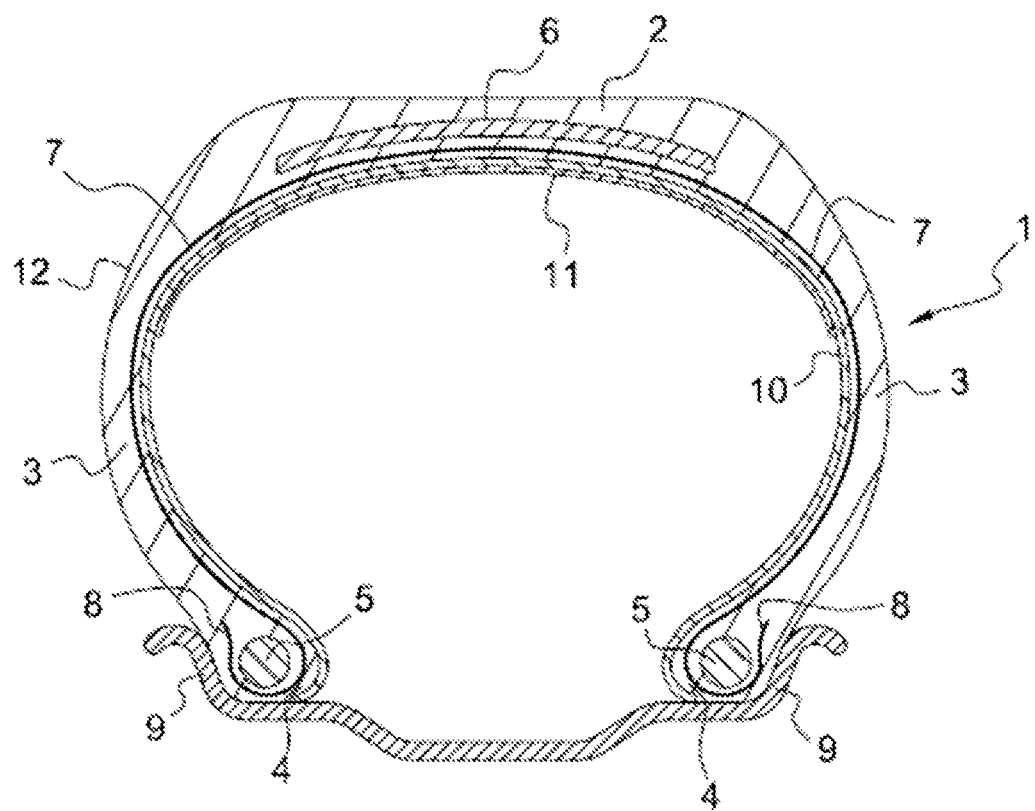

METHOD FOR APPLYING TO THE INNER WALL OF A TIRE

This application is a 371 national phase entry of PCT/EP2013/069336, filed 18 Sep. 2013, which claims benefit of the filing date of French Patent Application No. 1258923, filed 24 Sep. 2012 and French Patent Application No. 1261633, filed 5 Dec. 2012, the contents of which are incorporated herein by reference.

BACKGROUND

1. Field

The disclosure relates to a process for applying particles to the inner wall of a tire comprising at least one layer of self-sealing composition.

2. Description of Related Art

In order to protect the tire against any perforation caused by the partial or total penetration of external objects, a layer of self-sealing composition is applied to at least one portion of the inner wall of the tire.

However this layer of self-sealing composition, applied to the tire after the curing thereof, has the property of being particularly tacky.

This tacky aspect quite often causes a problem during the transport and storage of the tires. Specifically, during these steps, the tires are arranged so as to be aligned next to one another or overlapped in a chain and are then compressed together.

During this compression, some of the parts forming the tire, namely the sidewalls and the crown, are pressed against one another and consequently adhesively bonded to one another with no possibility of detaching them without damaging, or even destroying, the architectural structure of the tire.

Thus, there remains the need to still be able to continue the application of this layer of protective self-sealing composition over all or part of the inner wall of the tires, while then being able to transport them and store them, without some of their constituent parts adhering to one another.

SUMMARY

A subject of the invention is therefore a process for applying particles to the inner wall of a tire comprising two sidewalls, a crown provided radially externally with a tread, a carcass-type reinforcing structure and at least one crown reinforcement, the inner surface of the sidewalls and of the crown forming an inner wall, at least one portion of said inner wall being covered with at least one layer of self-sealing composition. The invention is characterized, in certain embodiments, in that the particles are applied, after the curing of the tire, to the layer of self-sealing composition by a flocking technique.

Furthermore, the application of a plurality of short fibres to the inner surface of a tire for the purpose of reducing the intensity of the noise experienced inside the vehicle is already known from document JP2004-082387A. This application of the fibres is carried out on an adhesive composition previously applied to said inner surface of the tire. The adhesive composition and the short fibres are both applied before the curing of the tire, therefore to a green tire.

Unlike JP2004-082387A, the layer of particles, present on the tire according to an embodiment of the invention, is applied after the step of curing the tire and, consequently, is applied to a cured tire. This thus makes it possible to guarantee and retain a good quality of the application of the particles and of their subsequent visual finish. Indeed, applied to an already cured tire, the particles do not consequently undergo degradations due to the increase in temperature and pressure in the curing press.

The process, as defined according to an embodiment of the invention, makes it possible to obtain a tire thus having the advantage of keeping its architectural structure perfectly intact, and consequently all its technical performances, once fitted to the rim, in so far as the addition of these particles does not in any way interfere with the subsequent correct operation of the tire when rolling, nor influence the effectiveness of the layer of self-sealing composition.

The flocking technique is preferably carried out by spraying under pressure.

Preferably, the shape of the particles may be defined by the ratio L/E of greater than 3, where L represents the length or largest dimension of the particle and E represents the mean thickness of the particle. The ratio L/E is more preferably greater than 5.

Preferably, the particles have a mean diameter of between 0.2 and 5 mm. The particles may have any geometric shape.

Preferably, the particles have a monochromatic or polychromatic colour. The presence of coloured particles on the inner wall of a tire additionally makes it possible to distinguish it from a tire not treated by the process of an embodiment of the invention.

The particles may be selected from organic synthetic fibres, mineral synthetic fibres, synthetic fibres, natural fibres, used tire grindings or grindings derived from production scrap or a combination thereof.

Included among the organic synthetic fibres are polyolefins, aliphatic polyamides, aromatic polyamides, and polyesters. Included among the mineral synthetic fibres are carbon fibres, glass fibres and polyester fibres. Included among the natural fibres are cotton fibres, silk fibres, wool fibres and cellulose fibres.

The particles may be selected from tire grindings which preferably have a size ranging from around 1 µm to 5 mm. The grindings may comprise reinforcing threads. These threads are defined as being any elongate element of great length relative to its cross section, whatever the shape of the latter, for example circular, oblong, rectangular, square or even flat, it being possible for this thread to be straight or not straight, for example twisted or wavy.

This reinforcing thread may take any known form. For example it may be an individual monofilament of large diameter (for example preferably equal to or greater than 50 µm), an individual ribbon, a multifilament fibre (consisting of a plurality of individual filaments of small diameter, typically less than 30 µm), a textile folded yarn formed from several fibres twisted together, a textile cord formed from several fibres or monofilaments cabled or twisted together, or else an assembly, a row of threads such as for example a band or strip comprising several of these monofilaments, fibres, folded yarns or cords grouped together, for example aligned along a main direction, whether straight or not.

The particles preferably have a mean thickness of between 0.1 and 0.5 mm, and may cover between 60% and 95% of the inner wall of the tire.

BRIEF DESCRIPTION OF DRAWING

The invention will now be described with the aid of the sole FIGURE and exemplary embodiments that follow, and which are given solely by way of illustration.

The sole FIGURE represents, in cross-section, a tire according to an embodiment of the invention provided on its inner surface with a layer of particles.

DETAILED DESCRIPTION OF SPECIFIC EMBODIMENTS

As can be seen in this FIGURE, the tire of general reference 1 comprises a crown 2 reinforced by two crown reinforcements or belt 6, two sidewalls 3 and two beads 4, each of these beads 4 being reinforced with a bead wire 5. The crown 2 is surmounted by a tread (not shown). A carcass reinforcement 7 is wound around two bead wires 5 in each bead 4, the upturn 8 of this reinforcement 7 lying for example towards the outside of the tire 1 which is shown here fitted on its rim 9. The carcass reinforcement 7 consists, as is known per se, of at least one ply reinforced by cords referred to as "radial" cords, for example textile or metal cords, i.e. these chords are arranged practically parallel to one another and extend from one bead to the other so as to form an angle of between 80° and 90° with the circumferential mid-plane (plane perpendicular to the axis of rotation of the tire, which is located at mid-distance between the two beads 4 and passes through the middle of the crown reinforcement 6).

The inner wall of the tire 1 comprises a layer 10 of self-sealing composition on which a layer 11 of coloured cellulose fibre particles is arranged. In the present case, the fibres are yellow-coloured.

The layer 11 of particles, covering the layer 10 of self-sealing composition, preferably covers the inner wall corresponding to the crown 2 and to the shoulders 12 of the tire.

The cellulose fibres applied to the inner wall of the tire have a mean dimension of around 2 mm, and have any geometric shape.

The self-sealing composition may be an elastomer composition comprising at least a diene elastomer, a hydrocarbon resin and a liquid plasticizer. Besides various optional additives, it may or may not comprise a crosslinking agent and/or a small fraction of reinforcing filler. This self-sealing composition is described in application WO 2011/092179 A1.

The self-sealing composition may also be a composition comprising a blend of at least two solid elastomers, a polybutadiene or butadiene copolymer elastomer (compound A), a natural rubber or synthetic polyisoprene elastomer (compound B), the weight ratio A/B being between 10/90 and 90/10, a hydrocarbon resin, optionally with a filler as described in applications WO 2011/092122 and WO 2011/092123.

The self-sealing composition may also be a composition comprising a styrene thermoplastic elastomer as described in patent FR 2,917,996 or else a styrene thermoplastic elastomer and an extender oil as described in application WO 2008/080557.

The self-sealing composition may also be a multilayer laminate comprising a first layer of polystyrene/polyisobutylene block copolymer thermoplastic elastomer, and a second elastomer layer based on a styrene thermoplastic elastomer, identical to or different from the first. The first layer optionally comprises an extender oil, and the second comprises an extender oil as described in WO 2008/154996.

The self-sealing composition may also be an elastomer composition comprising at least a predominant elastomer, a styrene thermoplastic elastomer, extender oil and a hydrocarbon resin as described in WO 2009/059709.

The layer 11 of fibre particles is applied to the layer 10 by one of the known flocking techniques. Among these techniques, use may be made of flocking by screening and beating, flocking by spraying under pressure, electrostatic flocking or else flocking that combines the pneumatic process and the electrostatic process.

Preferably, the technique of flocking by spraying under pressure is used. It consists in mixing the particle fibres with pressurized air using an appropriate spray gun, then in projecting a mixture consisting of air and particles onto at least one portion of the layer 10 of self-sealing composition. The particles are guided by the airflow in order to be projected onto the tacky surface, on which they are implanted.

Another flocking application technique used is the electrostatic technique. This technique consists in subjecting the particles to an electric field, thus creating a high potential difference, of the order of 10 kV. The charged particles are then injected onto the surface of the layer 10 of self-sealing composition.

Depending on the size of the electrostatic force applied, it is possible to give the particles high accelerations, ensuring a deep embedding thereof, and consequently a good hold, and a high surface density.

The treatment of the tire according to an embodiment of the invention may be used in any type of tire for a motor vehicle, such as a motor vehicle of the two-wheeled, passenger or industrial type or for a non-motorized vehicle such as a bicycle. The tire according to an embodiment of the invention may be used for passenger vehicles capable of running at very high speed, or for heavy-duty vehicles capable of running and operating under particularly high internal temperature conditions.

The layer of particles is preferably positioned on the inner wall of the tire, partially or totally covering it. But this layer may be completely integrated into its internal structure.

The tire according to an embodiment of the invention has the advantage of exhibiting, over a very broad range of operating temperatures, very little degradation, especially in terms of punctures.

Dynamic and static puncture tests were carried out on the tire according to an embodiment of the invention. The results of these tests are collated below.

Dynamic puncture with nail penetration: the puncture of less than 5% of tire is observed regarding this anti-puncture performance.

Dynamic puncture with screw penetration: the puncture of around 10% of tire is observed regarding this anti-puncture performance.

Static puncture at a temperature of 0° C.: the puncture of less than 2% of tire is observed regarding this anti-puncture performance.

Static puncture at a temperature of −10° C.: the puncture of around 20% of tire is observed regarding this anti-puncture performance.

The invention claimed is:

1. A process for applying particles to an inner wall of a tire comprising two sidewalls, a crown provided radially externally with a tread, a carcass-type reinforcing structure and at least one crown reinforcement, an inner surface of the sidewalls and of the crown forming an inner wall, at least one portion of said inner wall being covered with at least one layer of self-sealing composition, comprising applying the particles, after the curing of the tire, to the layer of self-sealing composition by a flocking technique, wherein the particles are comprised of tire grindings.

2. The process according to claim 1, wherein the flocking technique is carried out by spraying under pressure.

3. The process according to claim 1, wherein a shape of the particles is defined by a ratio L/E of greater than 3, where L represents the length or largest dimension of the particle and E represents the mean thickness of the particle.

4. The process according to claim 1, wherein the particles have a mean diameter of between 0.2 and 5 mm.

5. The process according to claim 1, wherein the particles have any geometric shape.

6. The process according to claim 1, wherein the particles have a monochromatic yellow colour.

7. The process according to claim 1, wherein the applied particles establish a particle layer having a mean thickness of between 0.1 and 0.5 mm.

8. The process according to claim 1, wherein the particles cover between 60% and 95% of the inner wall.

9. The process according to claim 1, wherein the tire grindings comprise reinforcing threads.

\* \* \* \* \*